United States Patent
Karve et al.

(10) Patent No.: US 11,481,219 B2
(45) Date of Patent: Oct. 25, 2022

(54) STORE PREFETCHES FOR DEPENDENT LOADS IN A PROCESSOR

(71) Applicant: International Business Machines Corporation

(72) Inventors: Mohit Karve, Austin, TX (US); Edmund Joseph Gieske, Cedar Park, TX (US); George W. Rohrbaugh, III, Charlotte, VT (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 16/868,793

(22) Filed: May 7, 2020

(65) Prior Publication Data
US 2021/0349722 A1 Nov. 11, 2021

(51) Int. Cl.
*G06F 9/38* (2018.01)
*G06F 12/0875* (2016.01)
*G06F 9/30* (2018.01)

(52) U.S. Cl.
CPC ........ *G06F 9/3802* (2013.01); *G06F 9/30043* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| 7,231,511 | B2 | 6/2007 | Cornaby et al. | |
|---|---|---|---|---|
| 9,811,468 | B2 | 11/2017 | Hooker et al. | |
| 9,898,411 | B2 | 2/2018 | Hooker et al. | |
| 2010/0306503 | A1* | 12/2010 | Henry | G06F 9/3004 712/E9.033 |
| 2017/0286114 | A1* | 10/2017 | Herdrich | G06F 9/3836 |
| 2019/0347103 | A1* | 11/2019 | Shapira | G06F 9/381 |

FOREIGN PATENT DOCUMENTS

WO 2016155623 A1 10/2016

OTHER PUBLICATIONS

Kim et al. "Path Confidence based Lookahead Prefetching." 49th Annual IEEE/ACM International Symposium on Microarchitecture (MICRO), Oct. 15-19, 2016. 12 pages.
Srinath et al. "Feedback Directed Prefetching:Improving the Performance and Bandwidth-Efficiency of Hardware Prefetchers." IEEE 13th International Symposium on High Performance Computer Architecture. Feb. 10-14, 2007, pp. 1-12.

(Continued)

*Primary Examiner* — Scott C Sun
(74) *Attorney, Agent, or Firm* — Scully, Scott, Murphy & Presser, P.C.

(57) ABSTRACT

An information handling system, method, and processor that detects a store instruction for data in a processor where the store instruction is a reliable indicator of a future load for the data; in response to detecting the store instruction, sends a prefetch request to memory for an entire cache line containing the data referenced in the store instruction, and preferably only the single cache line containing the data; and receives, in response to the prefetch request, the entire cache line containing the data referenced in the store instruction.

20 Claims, 7 Drawing Sheets

(56) References Cited

OTHER PUBLICATIONS

Hallberg, J. "Optimizing Memory Performance with a JVM: Prefetching in a Mark- and-Sweep Garbage Collector." Master's Thesis in Computer Systems at the School of Computer Science and Engineering, Royal Institute of Technology, Oct. 2003. 68 pages.

Anonymous. "Method for Hardware Prefetching of the Structured Data of Cache Miss Loads." IP.com, IPCOM000127016D. Aug. 17, 2005. 8 pages.

Anonymous. "Method and System for Enhancing Cache Utilization in Multi Socket Architectures through Distributed Coordinated Prefetching." IP.com, IPCOM000230930D. Sep. 18, 2013. 6 pages.

* cited by examiner

STORE PREFETCHES FOR DEPENDENT LOADS IN A PROCESSOR

BACKGROUND

Embodiments presented herein are related to handling and processing data and/or improving an information handling or data processing system, and more specifically, to identifying and handling of special store instructions by a processor, including in an embodiment prefetching special store instructions, for example, stack accesses by a processor.

With advancements in information technology and the wide use of the Internet to store and process information, more and more demands are placed on the acquisition, processing, storage and dissemination of information by computing systems. Computing systems are being developed to increase the speed at which the computers are able to execute increasingly complex applications for business, personal use, and entertainment. Overall computer system performance is affected by each of the key elements of the computer structure, including the performance/structure of the processors, any memory caches, input/output (I/O) subsystems, efficiency of the memory control functions, the performance of the memory devices and systems, and any associated memory interface elements, and the type and structure of the memory interconnect interfaces.

The constantly increasing speed of processors which execute increasingly complex applications places more rigorous performance demands on all of the other subsystems in the computer. Computing demands require the ability to access data at increasing speeds and efficiency. One technique to decrease latency in processors is to prefetch data so that the data is local to the processor before it is needed. Traditional prefetchers use access patterns found using data or instruction addresses to prefetch data into some level of cache in the processor cache hierarchy. It would be advantageous to increase prefetching from memory subsystems data into the cache hierarchy of a processor to reduce processor latency.

SUMMARY

The summary of the disclosure is given to aid understanding of a computer system, its architectural structure and methods of operation; a processor, its architectural structure and methods of operation; and a memory subsystem, its architectural structure and methods of operation, and methods of transmitting data between a processor and a memory subsystem, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system and its architectural structure; a processor and its architectural structure; a memory subsystem and its architectural structure; and their methods of operation to achieve different effects.

Certain aspects of the present disclosure provide an information handling or computer system, a processor, a memory subsystem, and/or a method of processing data. In one or more embodiments a method of processing data in an information handling system includes: detecting a store instruction for data in a processor where the store instruction is a reliable indicator of a future load for the data; in response to detecting the store instruction, sending a prefetch request to memory for an entire cache line containing the data referenced in the store instruction; and receiving, in response to the prefetch request, the entire cache line containing the data referenced in the store instruction. In an aspect, the prefetch request sent to memory is for only a single, entire cache line, and in a further aspect the data referenced by the store instruction is not for an entire cache line. In an embodiment, the method further includes performing a store read operation for the entire cache line containing the data referenced in the store instruction and using portions of the entire cache line retrieved from memory, and in an aspect, using portions of the entire cache line retrieved from memory includes: receiving the entire cache line from memory; overwriting a first portion of the entire cache line received from memory that contains the data referenced in the store instruction; and keeping a second portion of the entire cache line containing the data not referenced in the store instruction. The method according to an embodiment includes processing a subsequent load instruction after the store instruction, where the load instruction is for the same data referenced in the store instruction; and using the data referenced in the store instruction for the subsequent load instruction. In an aspect the store instruction references a designated stack access register, the store read uses the cache line fetched to cache in response to the prefetch request, and/or the prefetch request is to transmit the entire cache line to cache. The method according to an embodiment further includes setting a flag in response to detecting the store instruction; and sending the prefetch request in response to reading the flag.

In one or more embodiments an information handling system is disclosed that includes: a memory subsystem; a processor; and one or more data caches having circuitry and logic to hold data for use by the processor, where the processor in an embodiment has an instruction fetch unit having circuitry and logic to fetch instructions for the processor (including store and load instructions); a memory controller having circuitry and logic to manage the store and load instructions; and a load store unit having circuitry and logic to execute store and load instructions where the load store unit has a prefetcher. The processor in one or more embodiments is configured to: detect a store instruction for data where the store instruction is a reliable indicator of a future load for the data; in response to detecting the store instruction, send a prefetch request to the memory subsystem for an entire cache line containing the data referenced in the store instruction; and receive in the one or more data caches, in response to the prefetch request, the entire cache line containing the data referenced in the store instruction. The system according to an embodiment includes a decode unit that is configured to detect the store instruction, and in response to detecting the store instruction setting a flag; and the prefetcher is configured to send the prefetch request in response to reading the flag.

In a further aspect, a processor is disclosed having an instruction fetch unit having circuitry and logic to fetch instructions for the processor, including store and load instructions; a load store unit having circuitry and logic to execute store and load instructions, the load store unit having a prefetcher; a memory controller having circuitry and logic to manage the store and load instructions; one or more data caches having circuitry and logic to hold data for use by the processor, and a computer readable storage medium having program instructions, the program instructions executable by the processor. The program instructions when executed by the processor cause the processor in one or more embodiments to: detect a store instruction for a stack access to a designated stack access register; in response to detecting the store instruction for a stack access, send a prefetch request to a memory subsystem for an entire cache line containing the data referenced in the store instruction; and receive in the one or more data caches, in response to the prefetch request, the entire cache line containing the data referenced in the store instruction.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features, and embodiments of the information handling system, computer system, computer architectural structure, processor, memory subsystem, and their methods of operation will be better understood when read in conjunction with the figures provided. Embodiments are provided in the figures for the purpose of illustrating aspects, features, and/or various embodiments of the computer system, computer architectural structure, processor, memory subsystem, and their methods of operation, but the claims should not be limited to the precise arrangement, structures, subassemblies, circuitry, modules, units, features, aspects, methods, processes, embodiments, or devices shown, and the arrangements, structures, subassemblies, circuitry, modules, units, features, aspects, methods, processes, embodiments, and devices shown may be used singularly or in combination with other arrangements, structures, subassemblies, circuitry, modules, units, features, aspects, methods, processes, embodiments, and devices.

DETAILED DESCRIPTION

The following description is made for illustrating the general principles of the invention and is not meant to limit the inventive concepts claimed herein. In the following detailed description, numerous details are set forth in order to provide an understanding of information handling systems, computer systems, computer architectural structures, processors, memory subsystems, and their methods of operation, however, it will be understood by those skilled in the art that different and numerous embodiments of the computer systems, computer architectural structures, processors, memory subsystems, and their methods of operation may be practiced without those specific details, and the claims and invention should not be limited to the arrangements, structures, subassemblies, circuitry, modules, units, features, aspects, processes, methods, embodiments, devices, or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

The following discussion omits or only briefly describes conventional features of information processing systems; including processors and microprocessor systems, their architecture and method of operation; and memory subsystems, their architecture, and method of operation, which are apparent to those skilled in the art. It is assumed that those skilled in the art are familiar with the general architecture and operation of information handling systems; the general architecture and operation of processors, including processors which operate in an out-of-order execution fashion, and multi-slice processors; and the general architecture and operation of memory subsystems; including the storing, fetching, and transfer of data between processors and memory subsystems. It may be noted that a numbered element is numbered according to the figure in which the element is introduced, and is typically referred to by that number in succeeding figures.

Embodiments presented herein disclose system and techniques for improving processor efficiency and processor power consumption, and decreasing system latency. The system and method in one or more embodiments prefetches a cache line for store instructions that are typically followed by load instructions for the same cache line. In one or more embodiments, rather than prefetching sequential cache lines, when a certain store instruction misses the cache, a prefetch for only that cache line is sent out to bring the data locally to the cache hierarchy in the processor. Using prefetches on certain store streams will permit the subsequent load instructions to have faster access to the data. In one or more embodiments, when a store instruction is directed at or references a designated stack access register, a prefetch is sent out for the data addressed by the store instruction. For example, in the IBM Power architecture, the R1 register is used for stack accesses and in one or more embodiments, a store instruction that accesses the R1 register triggers a prefetch for the cache line addressed by the store instruction in response to the store instruction missing in the cache. In an embodiment, when the store dispatches from the cache store queue, the cache line should already be in or on its way to the processor cache, so the store read and subsequent dependent load instruction is serviced quicker.

In one or more embodiments, a special type of store prefetch is disclosed for stack accesses, e.g., a stack push. Typically a processor has a designated stack access register, for example register R1 in IBM Power Architecture. Stack accesses tend to be a small amount of data that is stored to and then in close proximity read from memory. Stores that reference the designated stack access register, e.g., register R1, are pushes onto the stack and loads that reference the designated stack access register, e.g., register R1, are pops from the stack. Every push (or store) to the designated stack access register typically is followed by a pop (or load) from the stack. Store accesses (pushes) to the stack are a reliable indicator or predictor of future load accesses (pops) to the stack. In scenarios where a store access to the stack is a reliable indicator of a future load, in one or more embodiments, a prefetch for the data identified by the store access should provide faster access to the data when the load access (pop) to the stack occurs. In an aspect, when a store instruction that references the stack allocates a prefetcher entry, rather than sending a prefetch for X+1 and subsequent lines as would typically occur with a processor, the prefetcher instead sends out a prefetch for only line X. Stores have a lifetime of tens of cycles in the store queue before draining to memory. Rather than starting a store read at drain time, the store read operation for certain types of store instructions can be started as soon as the store operation misses in the processor cache. Prefetching the cache line also speeds up the future load from the stack, which is dependent upon the store read being requested from the store queue and the subsequent long latency to get the data back from memory.

Figure 1:
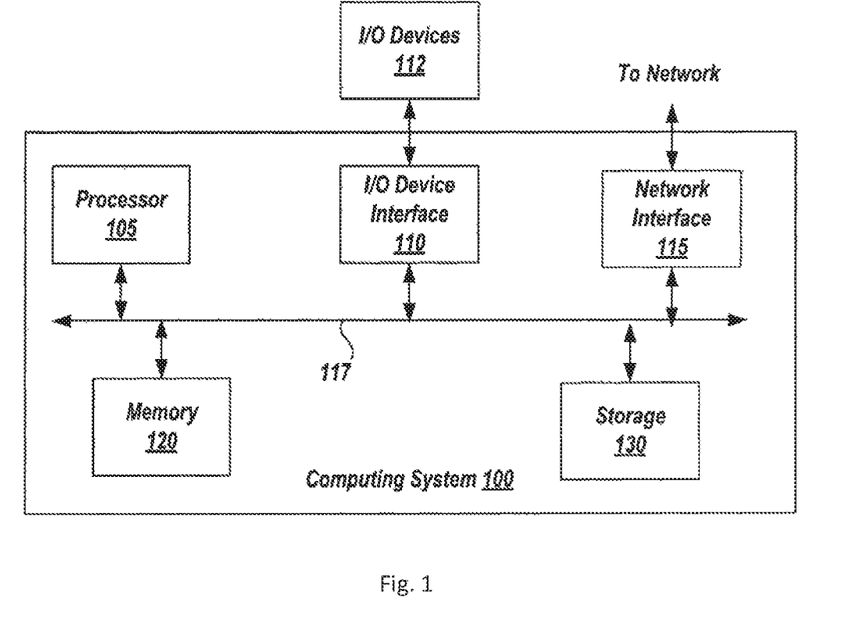
FIG. 1 illustrates an example computing or information handling system, according to one or more embodiments of the present disclosure.

Turning to the environments in which the system, product, methods, techniques, and programming instructions have potential application, FIG. 1 illustrates an example computing or information handling system 100 configured with a processor 105 and memory subsystem 120, according to an embodiment. As shown, the computing system 100 includes processor 105, network interface 115, memory 120, and storage 130, each connected to bus 117. The computing or information handling system 100 may also include an I/O device interface 110 connecting I/O devices 112 (e.g., keyboard, display, and mouse devices) to the computing system 100. Further, in the context of the present disclosure, the computing system 100 is representative of a physical computing system, e.g., a desktop computer, laptop computer, tablet, server, etc. Of course, the computing system 100 will include a variety of additional hardware components.

The processor 105 retrieves and executes programming instructions and data stored in memory 120, e.g., main memory 120, as well as stores and retrieves application data residing in more remote storage 130. The bus 117 is used to transmit instructions and data between the processor 105, I/O device interface 110, network interface 115, memory 120, and storage 130. Memory 120 is generally included to be representative of a memory subsystem (e.g., main memory) and can include caches, interconnects, and random access memory (RAM), e.g., dynamic random access memory (DRAM). Memory 120 stores program instructions and operand data used by the processor 105. Storage 130 may be a combination of fixed and/or removable storage devices, such as fixed disc drives, removable memory cards, or optical storage, network attached storage (NAS), or a storage-area network (SAN).

Figure 2:
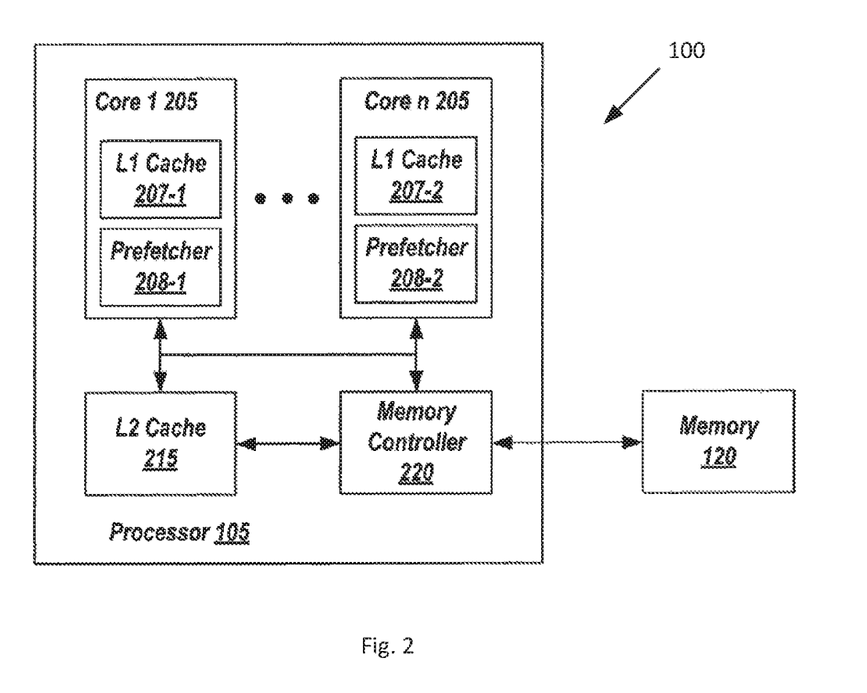
FIG. 2 further illustrates the processor described relative to FIG. 1, according to one or more embodiments.

FIG. 2 further illustrates the processor 105 configured to benefit from identifying or predicting, and implementing, prefetching of cache lines, according to an embodiment. In one or more embodiments, the processor of FIG. 2 is configured to prefetch the cache line of a store instruction indicative of a future (dependent) load, for example, in response to the store instruction missing in the cache on the processor. As shown, the processor 105 includes one or more cores, from core 1 205 to core n 205, a Level 2 (L2) cache 215, and a memory controller 220. As shown, the cores 205 each include a Level 1 (L1) cache 207, and a prefetcher 208. The processor 105 most likely includes a variety of additional components. The information handling system 100 likely includes a variety of additional components, including for example a last-level, or L3 cache (not shown). The processor core 205 including the L1 cache 207 and the prefetcher 208, the memory controller 220, and the L2 cache 215 each contain circuits and logic to perform their respective functions.

The L1 cache 207 and/or the L2 cache 215 are processor hardware caches used by the processor to reduce the time to access data from main memory. A cache is a smaller usually faster memory, located closer to a processor core, which stores copies of the data from frequently used main memory locations. The L1 caches 207 and L2 cache 215 may include separate instruction and data caches implemented using high speed memory devices. The caches 207 and 215 may temporarily store values that might be repeatedly accessed by the processor 105 to more quickly process data, e.g., by avoiding loading values from memory 120. Additional cache levels (e.g., a Level 3 (L3) cache) may be provided. Each cache level from highest (L1) to lowest (L3) may successively store more information, but with a longer access penalty. Each cache includes a number of memory blocks that individually store various instructions and data values. Data is transferred between memory 120 and data cache typically in blocks of fixed size called cache lines (CLs) or cache blocks. When a cache line (CL) is copied from memory into cache on a processor, a cache entry is created. The cache entry can include a variety of fields, and typically for data cache will include the data in a data field, and the requested address or location in main memory in an address field.

When the processor needs to read or write a location in memory, the cache is first checked for a corresponding or matching entry. The cache checks for the contents of the requested memory location in any cache lines in the cache that might contain that address/location. If the processor determines that the memory location is in the cache, a cache hit occurs and the processor reads or writes the data in the cache line. If, however, the processor does not find the memory location in the cache, a cache miss occurs, the cache in an embodiment allocates a new cache entry, data from main memory is copied into the new cache entry, and the memory request is fulfilled from the contents of the cache entry.

The prefetcher 208 prefetches data from main memory into the data caches. To do so, the prefetcher 208 may include logic that detects monotonically increasing or decreasing sequences of demand accesses to cache lines having common address spacing. The prefetcher 208 typically identifies and prefetches data access patterns of the memory 120. The prefetcher 208 in an embodiment manages a cache structure for prefetch streams, e.g., the L3 cache, and in an aspect predicts which of the data streams will be required by the processor 105. The memory controller 220 in an embodiment is configured to receive prefetch requests from prefetcher 208. The conditions for allocating a prefetch request queue entry for a hardware stream in a typical data address prefetcher include the data request missing in the processor cache, the request has passed translation, and the resources have been allocated to send a request to memory. If the data request misses on line X, the typical prefetcher will start prefetching the next cache line in the stream (line X+1), and prefetch future lines based on the specifics of the prefetcher design. Typically, prefetchers do not perform special actions based upon the type of instruction being processed. Further, prefetching store streams is generally bad for performance because it is preferable to gather stores before reading the cache line from memory. Gathering the stores before reading the cache line from memory permits the cache to claim ownership of cache lines that are completely written by the processor core without having to expend the bandwidth to read the cache line from memory.

The techniques, methods, and mechanisms disclosed for prefetching the cache line for store instructions, e.g., pushes to the designated stack access register, can be added to an existing data or instruction based prefetcher. In this regard, while a prefetcher generally starts fetching the next cache line in the stream after the miss (cache line X+1), in one or more aspects, when a store instruction that references the designated stack register (register R1 on IBM Power architecture, other registers on other architectures) allocates a prefetch entry, rather than sending a prefetch for the X+1 cache line and subsequent cache lines, the prefetcher will instead send out a prefetch only for line X. Prefetching in this manner reduces pressure on store queue read requests to memory, as less time is spent waiting for store reads to come back from memory. Rather than starting a store read at draining time (after the last store to the cache line is seen), the store read can be started as soon as the first store to the cache line is seen. In addition, it also speeds up the future load from the stack, which is also dependent upon the store read from the store queue. The prefetcher will have the circuitry and logic to perform the functions described herein, including prefetching a single cache line in response to a stack access, e.g. a store to a designated stack access register.

Figure 3:
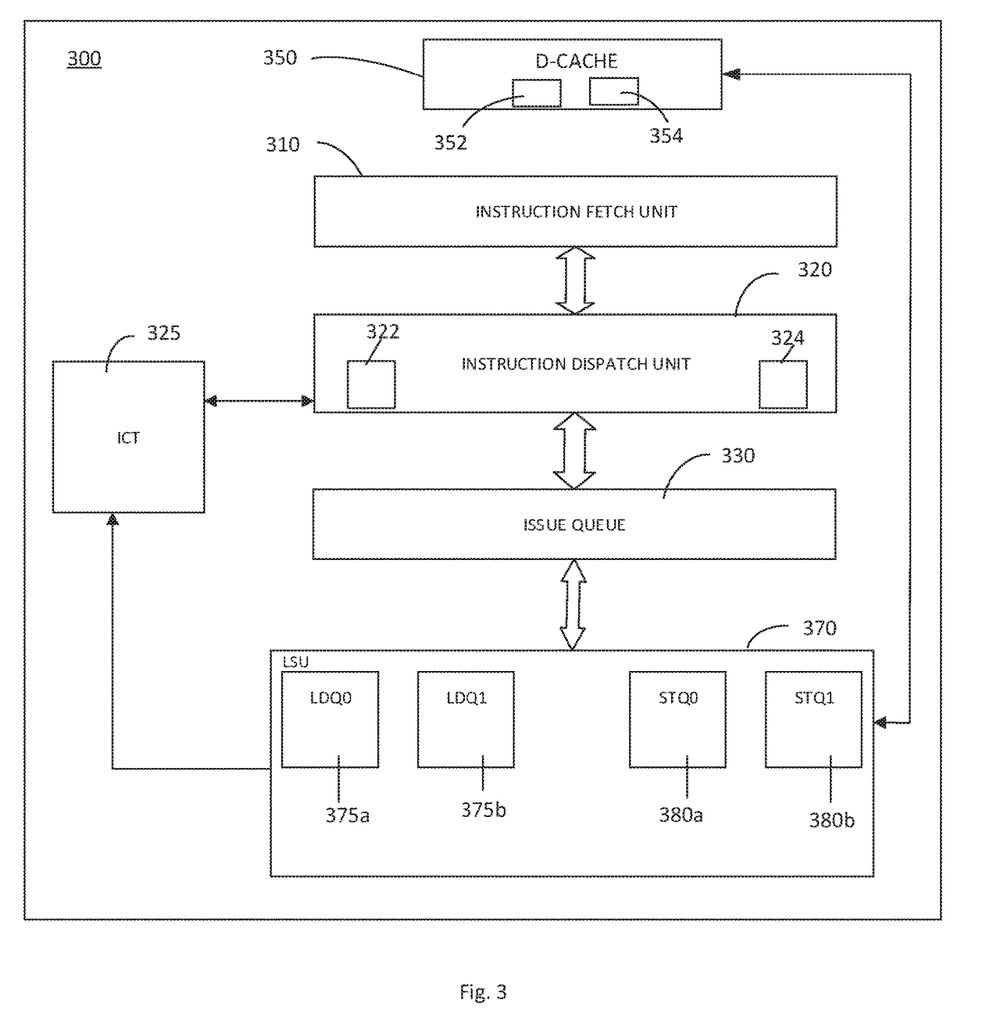
FIG. 3 illustrates portions of a processor core in which certain aspects of the present disclosure may be practiced.

FIG. 3 illustrates a portion of a processor pipeline, according to an embodiment of the disclosure. It should be noted that FIG. 3 only shows portions of processor 300 in diagrammatic fashion for purposes of discussion. Processor pipeline 300 in FIG. 3 includes Instruction Fetch Unit (IFU) 310, Instruction Dispatch Unit 320, Issue Queue (ISQ) 330, Instruction Completion Table (ICT) 325, Data Cache 350, and Load Store Unit (LSU) 370. The LSU 370 includes one or more load queues (LDQ) 375 that hold load instructions, and one or more store queues (STQ) 380 that hold store instructions. The processor may include other circuits, functional units, and components.

The Instruction Fetch Unit (IFU) 310 fetches instructions to the Instruction Dispatch Unit 320, which dispatches instructions to the Issue Queue (ISQ) 330, typically in program order. The IFU 310, the Dispatch Unit 320, and the ISQ 330 each have circuitry and logic to perform their respective functions. The Issue Queue (ISQ) 330 will issue store and load instructions to the LSU 370, and more particularly will issue load instructions to the load queue (LDQ) 375 and store instructions to the store queue (STQ) 380 in the LSU 370. The LSU 370 has circuitry and logic to perform its functions. The ISQ 330 typically holds an instruction until data associated with the instruction has been retrieved and is ready for use. For example, when data has been retrieved and placed in data cache 350, e.g., L1 cache 352 or L2 cache 354, associated with the processor 300. When data is not ready, e.g., not within the appropriate data cache, delay can result as the ISQ 330 will not issue the instruction to the execution unit. For at least this reason, the Issue Queue (ISQ) typically issues instructions, e.g., load and store instructions, to the execution units, e.g., LSU 370, out of order so instructions where the required data is available can be executed.

Figure 4:
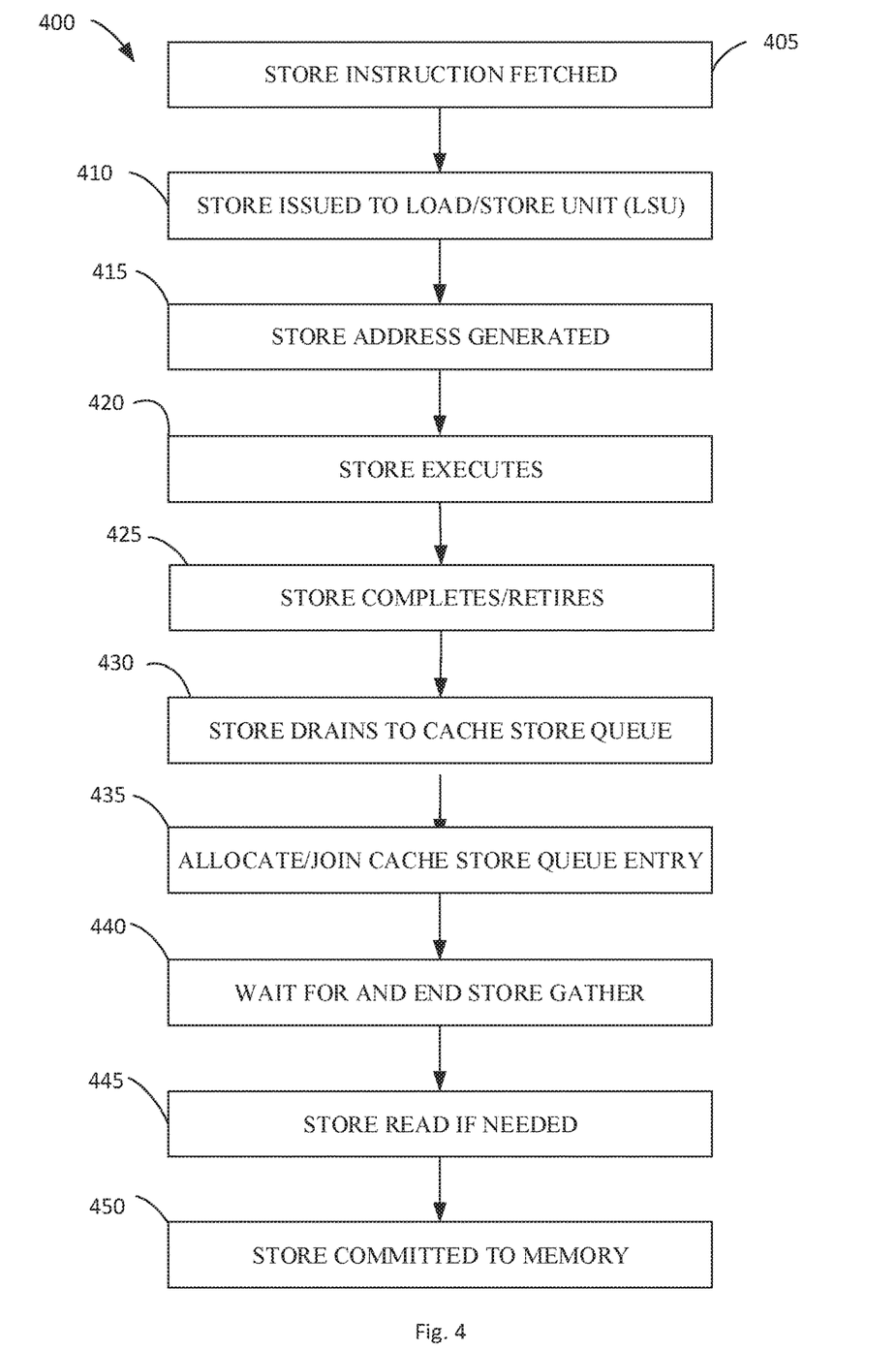
FIG. 4 illustrates a flow diagram of a method of storing data in an information processing system.

Typical processing of store instructions as shown in the flow chart of FIG. 4 start with store instructions fetched (405) from IFU 310, which issue (410) to the LSU 370 where the store address is generated (415), the store is executed (420), and the store completes or retires (425) in the processor core. After completing in the LSU 370 in the processor core, the store drains (is sent to) the store queue in the processor cache (430), e.g., L2 cache 354. In the cache store queue, a given store attempts to join into an existing store queue entry, and if there is no match in the store queue entry, a new store queue entry is allocated (435). The store waits in the store queue as other stores are collected and gathered until a full line worth of stores are gathered, or after a period of time runs out (e.g., tens of cycles), and then the store is dispatched from the store queue (440). The store in the store queue will be read if needed (445). That is, if after a period of time only a partial cache line has gathered in the store queue in the cache, a store read request is sent to memory. The memory controller will transfer ownership and also send the data, e.g., the entire/full cache line, to the store queue. The cache store queue will overwrite the required section of the cache line (e.g., the portion of the cache line gathered in the store queue) and save the cache line in the cache. If on the other hand, a full cache line in gathered in the store queue, memory is informed that the processor core is writing a full line. The memory controller will transfer ownership to the store queue but will not send data to the store queue in the cache (will not send data to the processor) as the cache has the entire/full cache line and the cache line is held in the cache for potential further processing. This process of waiting for stores to gather is usually used because many times the store queue is able to gather full/entire cache lines. When full cache lines are gathered the store read to memory is not required as the cache informs the memory that it is the owner of the new copy of the cache line (it would overwrite all of the data received from memory if the store read was performed). The store, depending upon the design of the processor, at some point will commit the store to memory (450).

Figure 5:
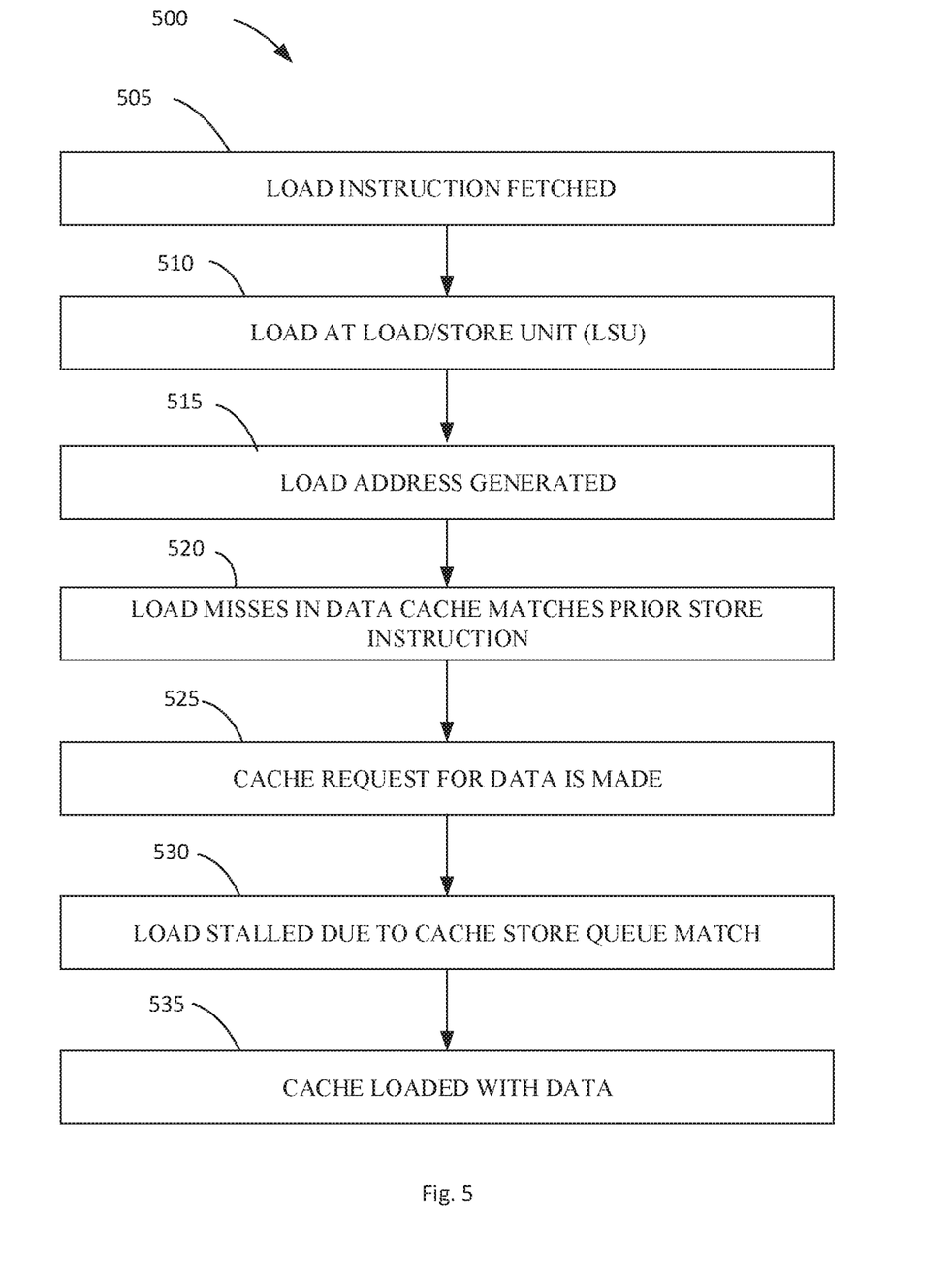
FIG. 5 illustrates a flow diagram of a method for fetching data for an execution unit in a processor.

Typical processing of a subsequent load instruction for the same data as the earlier store instruction is shown in the flow chart of FIG. 5 where a load instruction for data is fetched (505) from the IFU 310 and is issued (510) to the LSU 370 where the load address is generated (515). In the scenario where the load instruction misses (520) in the data cache (and the memory address matches the prior store instruction), a request to a lower cache (L2 cache) is made (525). The load instruction stalls (530) while it is checked if the cache line is being processed and needs updating, and after the cache line is checked and processed, the load request is sent to lower levels of cache and/or main memory until the data cache, e.g., the L2 cache and/or L1 cache, is uploaded with the cache line, e.g., data (535).

Stack accesses typically use random data from the stack, with minimal temporal or spatial locality. Stack accesses always push (store) onto the stack first, and then pop (load) from the stack later, and rarely consume a full cache line. With stack pushes, a dependent load typically follows and it is highly likely that there will not be enough stack pushes to write a full cache line at the L2 store queue so a store read operation from memory will need to be performed. Future loads generally see the store miss the L2 cache, the store join or allocate on a gathering line in the L2 cache store queue and wait till the store dispatches from the store queue, and the store read request sent to memory. The load then is serviced after the store read is completed and written with data from the store queue.

This disclosure proposes a system, processor, product, programming instructions, technique, and/or method to process a store instruction that is typically followed by a dependent load instruction and/or a store instruction that is a reliable predictor of a future load instruction for the same data. The system, processor, product, programming instructions, technique and/or method should decrease processor latency where store instructions are reliable predictors of future load accesses to the same data. A system, processor, product, programming instructions, technique, and or method is disclosed to process a stack access where data is stored to memory (stack push) and then read from memory (stack pop) in close proximity. For example, a store instruction that references a designated stack access register, the R1 register for example in IBM Power Architecture, and/or other registers on other processor architectures, allocates a prefetch for the cache line identified by the store instruction. That is, in one or more embodiments when the processor detects a store with a base address in the designated stack access register, e.g., register R1, an L3 prefetch is immediately sent out for that cache line. The store drains normally and attempts to gather at the L2 cache store queue while the prefetch is being serviced in the background. When the store read dispatches from the L2 store queue, the cache line should already be in or on the way to the L3 cache so the store read is serviced sooner. Dependent loads are serviced sooner as the L3 prefetch masks latency.

Figure 6:
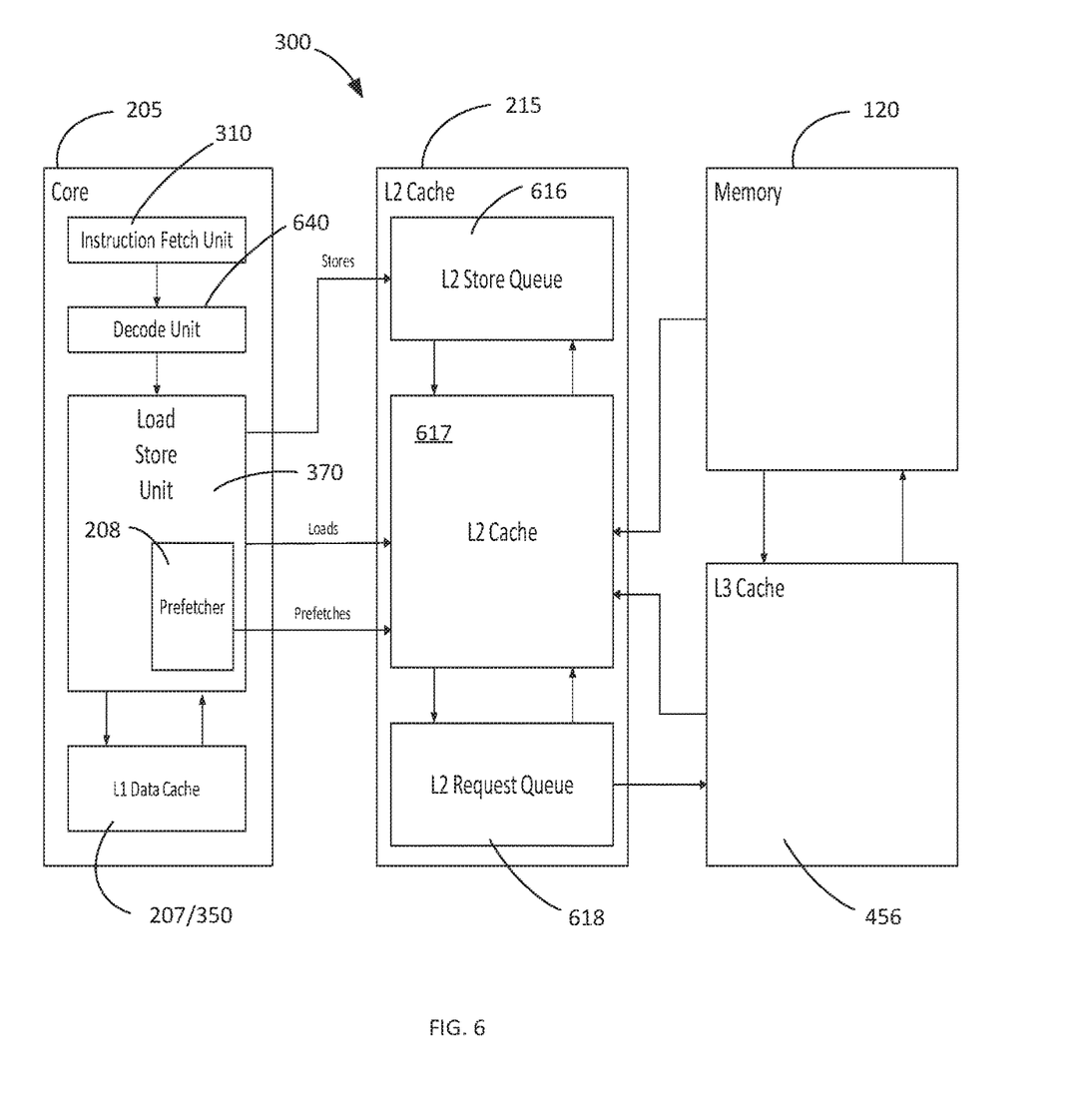
FIG. 6 illustrates portions of an information handling system in which certain aspects of the present disclosure may be practiced.

FIG. 6 illustrates a simplified block diagram of a portion of an information handling system 300 having a processor core 205 that includes an Instruction Fetch Unit (IFU) 310, a decode unit 640, a L1 data cache 207/350 and an LSU 370 that has a prefetcher 208. Information handling system 300 further includes a L2 cache 215 having a L2 store queue 616, a L2 Request Queue 618, and the L2 Cache entries 617 for holding the data. Information processing system further includes L3 cache 456 and (main) memory subsystem 120. There are communication links between the various functional units as illustrated in FIG. 6. The prefetcher 208 in LSU 370 in one or more embodiments is designed and configured to prefetch data referenced in special store instructions, for example store instructions that are reliable predictors of future load accesses, such as, for example, store instructions that reference designated stack access registers, and in an aspect store accesses to the stack. In an embodiment, a store instruction that references the designated stack access register allocates an entry in the prefetcher to send a request for the same cache line identified in the store instruction to potentially speed up the future (dependent) load from the stack. In one or more embodiments, the decode unit 640 detects the special type store instruction and sets a flag that is read by the LSU 370. The LSU 370 in response to reading the flag set for the special instruction allocates a prefetch entry in the prefetcher 208 to fetch the cache line (data), and in an aspect only the single cache line, referenced in the special type of store instruction. The decode unit 640, LSU 370 and/or prefetcher 208 will be configured with circuitry and logic to perform the functions as described herein.

It can be appreciated that different levels of cache can be arranged differently in the information handling system 300, on processor core 205, and memory subsystem 120 than illustrated in FIG. 6. For example, where the processor core 205 has a single data cache 350, also referred to as L1 Data Cache 207, the processor core 205 could have multiple cache levels, and different levels of cache can exist in the processor 105 and/or memory subsystem 120. The system, mechanisms, features, and techniques disclosed would have applicability to these different system and cache level architectures.

Figure 7A:
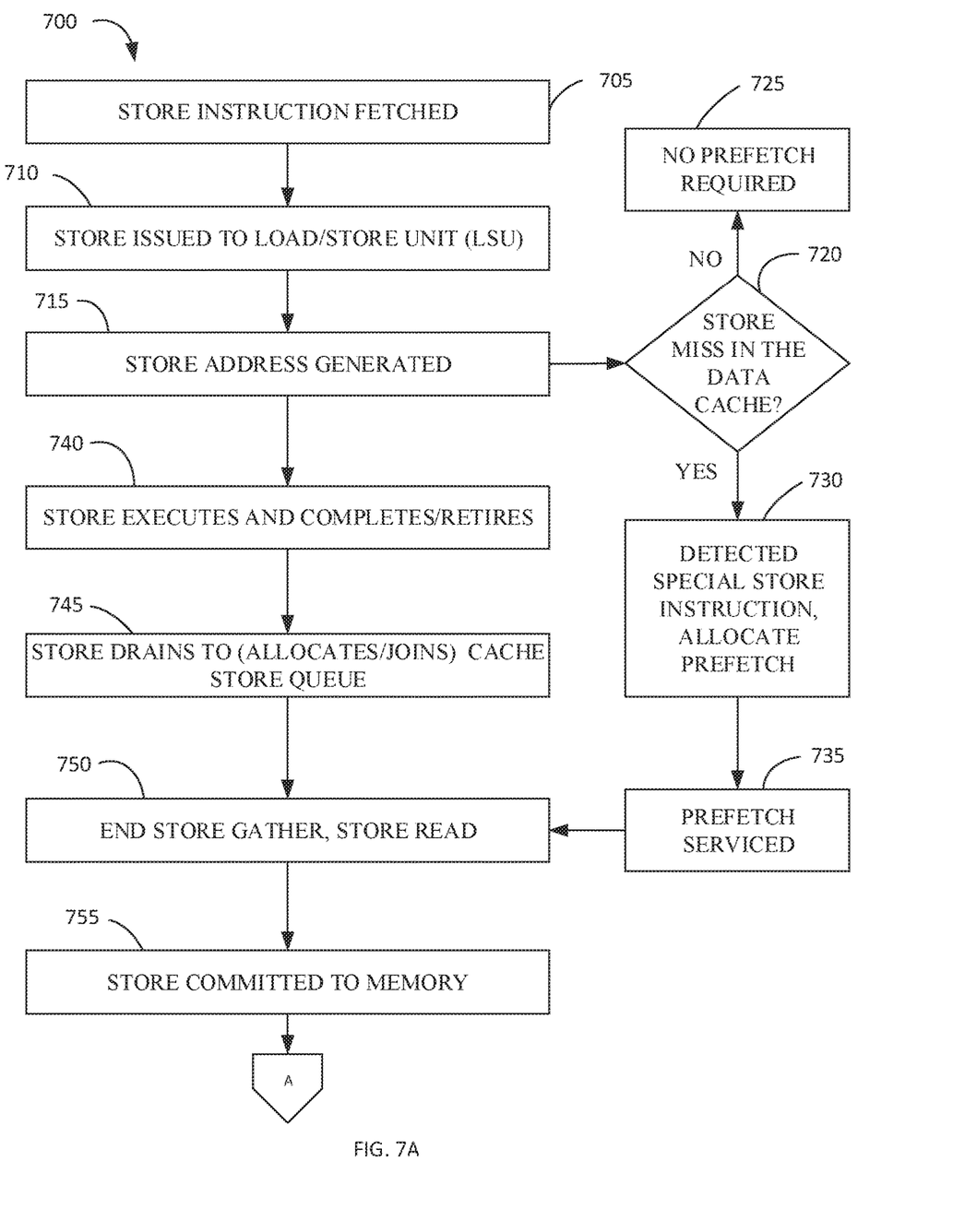
FIGS. 7A & 7B illustrates a flow diagram of a method of a special type of store prefetch according to one or more embodiments in which certain aspects of the present disclosure may be practiced.
Figure 7B:
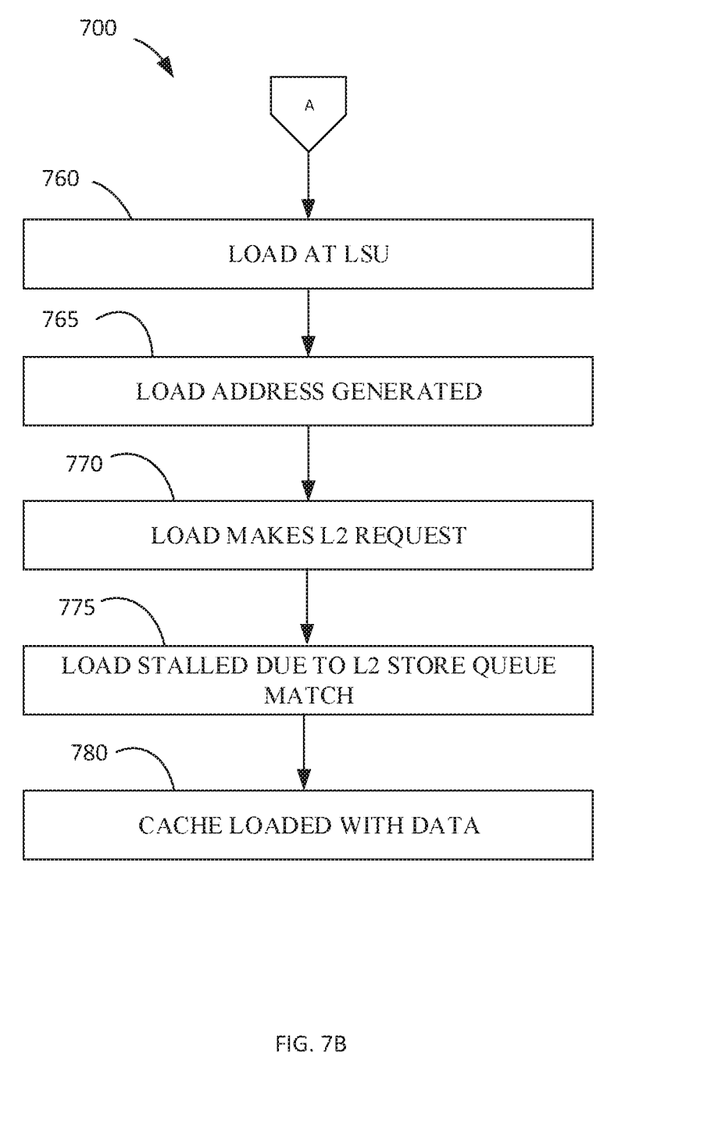

FIGS. 7A & 7B illustrate an example flowchart in accordance with one embodiment illustrating and describing a process, technique, or method 700 of handling instructions in an information handling system, and more specifically a method of prefetching store instructions, including a special type of store prefetch specifically for stack pushes and other store instructions that are reliable predictors of future load accesses for the same memory address. While the method 700 is described for the sake of convenience and not with an intent of limiting the disclosure as comprising a series and/or a number of steps, it is to be understood that the process does not need to be performed as a series of steps and/or the steps do not need to be performed in the order shown and described with respect to FIGS. 7A & 7B, but the process may be integrated and/or one or more steps may be performed together, simultaneously, or the steps may be performed in the order disclosed or in an alternate order.

The process 700 of FIGS. 7A & 7B is described with reference to FIG. 6, where in FIG. 7A at 705 a special store instruction, e.g., a store instruction that is a reliable predictor of future load instructions for the same data, is fetched by Instruction Fetch Unit (IFU) 310 and at 710 the store is issued to the load store unit (LSU) 370. The store instruction in an example is a stack access to a designated stack access register, for example the register R1 in IBM Power Architecture, or other registers in other processor architectures. Stack accesses tend to be a small amount of memory that is stored to and then read from in close temporal proximity. The store instruction is unlikely to write the whole cache line. Other special types of store instructions that are reliable predictors of future load accesses are contemplated. More specifically, in an embodiment, the store instruction would for example, be of the form "st Rx, R1, 0x1000", where Rx is any register and 0x1000 represents some offset off the address in R1. This store instruction would be detected in the decode unit 640 and a flag would be passed along with the store instruction as it goes to the load-store unit 370.

At 715 the address for the store is generated. The process 700, after 715, branches and proceeds along two paths. At 720 the data cache is checked for the data, and if the store request at 720 misses in the data cache (720: No), preferably the L1 data cache, then at 725 no prefetch is required, and processing of the prefetch stops. If at 720 the store misses in the data cache, (720: Yes), preferably the L1 data cache, then at 730, in response to detecting the special type of store instruction, e.g., a stack push, a prefetch for the data is allocated. In an aspect, the LSU 370 reacts to the flag being set and triggers the prefetch at 730 for the data. In an embodiment, when a store instruction with a base address in the designated stack register, e.g., the R1 register, is detected, a prefetch is sent at 730 for the cache line referenced by the store instruction. In an aspect, a prefetch is sent to bring the data, e.g., the cache line that is referenced in the store instruction, into the L3 cache 456. At 735 the prefetch is serviced and the prefetched cache line is loaded into cache, and in an aspect into L3 cache. It can be appreciated, that the prefetcher 208 in an aspect will prefetch only the single cache line rather than prefetching a stream of one or more cache lines, including subsequent cache lines.

While the prefetch is being serviced in the background at 735, the store executes and completes/retires at 740, the store drains at 745 to the cache store queue 616 where it allocates or joins a cache store queue entry, and stores are gathered at the cache store queue 616 until the store gather ends at 750. A store read request is sent to memory at 750. The cache line which is the subject of the store read request meanwhile is being obtained by the allocated prefetch already sent to memory. The cache line should be on its way to or in the cache when the store read request is sent to memory at 750. In this manner, the store read can be serviced sooner with the cache line being transmitted from memory sooner because of the prefetch. The L2 store queue will overwrite required sections of the cache line (e.g., the portion of the cache line gathered in the store queue), and save the cache line in the cache. The store at some point, depending upon the processor design, is committed to memory at 755.

Process 700 continues in FIG. 7B, where at 760 there is a (dependent) load instruction at LSU 370, e.g., for the data that was the subject of the previous store instruction. The load instruction is generally in close proximity to the earlier store instruction and can be referred to as a dependent load instruction. In an embodiment the load instruction is in the form of "ld Rx, R1, 0x1000" where Rx is any register and 0x1000 represents some offset off the address in R1. Performing the load operation is dependent on the store read from the store queue and by sending out the prefetch for the cache line of the store sooner, the cache line to be read should be in cache sooner, the store read should be serviced sooner, and the load which is dependent on the store read also should be serviced sooner. At 765 the load address is generated and the data (L1) cache is checked for the data. If the load misses in the data (L1) cache, at 770 the load makes an L2 Read Request. At 775 the load stalls as the L2 cache is checked, and as the L3 cache is checked. The cache line, depending upon the information handling system or processor design, should be available in one of the lower level caches, e.g., the L3 cache, in response to the pending prefetch request made at 730 and being serviced at 735. The data (L1) cache at 780 is loaded with the cache line which includes the data from the prefetch, which brought the data to one of the lower level caches, e.g., the L3 cache.

As the prefetch request for the desired data was previously dispatched, it is anticipated that the data requested by the load instruction will arrive in one of the levels of cache earlier than if the load instruction was serviced after the store instruction was drained to memory. That is the data requested by the load instruction will be available earlier in the cache because the data was subject to an earlier prefetch request. In one or more embodiments, rather than starting the store read at drain time, the store read via the prefetch can be started as soon as the store misses in the L1 data cache. In an aspect, the store stream is chased with prefetches so that future loads will have faster access to the data, for example, when the stack pop (load) occurs.

In the preceding, reference is made to embodiments presented in this disclosure. However, the scope of the present disclosure is not limited to specific described embodiments. Instead, any combination of the following features and elements, whether related to different embodiments or not, is contemplated to implement and practice various embodiments.

Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments presented herein may be devised without departing from the basic scope thereof, and the scope thereof is determined by the claims that follow.

What is claimed is:

1. A method of processing data in an information handling system, comprising:
    detecting a store instruction for data in a processor where the store instruction has been designated as an indicator of a future load for the data;
    in response to detecting the store instruction, sending a prefetch request to memory for an entire cache line containing the data referenced in the store instruction; and
    receiving, in response to the prefetch request, the entire cache line containing the data referenced in the store instruction.

2. The method according to claim 1, wherein sending the prefetch request to memory is for only a single, entire cache line.

3. The method according to claim 1, wherein the data referenced by the store instruction is not for an entire cache line.

4. The method according to claim 1, further comprising:
    performing a store read operation for the entire cache line containing the data referenced in the store instruction; and
    using portions of the entire cache line retrieved from memory.

5. The method according to claim 4, wherein using portions of the entire cache line retrieved from memory comprises:
    receiving the entire cache line from memory;
    overwriting a first portion of the entire cache line received from memory that contains the data referenced in the store instruction; and
    keeping a second portion of the entire cache line containing the data not referenced in the store instruction.

6. The method according to claim 1, further comprising:
    processing a subsequent load instruction after the store instruction, where the load instruction is for the same data referenced in the store instruction; and
    using the data referenced in the store instruction for the subsequent load instruction.

7. The method according to claim 1, wherein the store instruction references a designated stack access register.

8. The method according to claim 1, wherein the prefetch request is to transmit the entire cache line to cache.

9. The method according to claim 1, further comprising:
    setting a flag in response to detecting the store instruction; and
    sending the prefetch request in response to reading the flag.

10. The method according to claim 4, wherein the store read uses the cache line fetched to cache in response to the prefetch request.

11. An information handling system, comprising:
    a memory subsystem;
    a processor; and
    one or more data caches having circuitry and logic to hold data for use by the processor,
    the processor comprising:
    an instruction fetch unit having circuitry and logic to fetch instructions for the processor, including store and load instructions;
    a memory controller having circuitry and logic to manage the store and load instructions; and a load store unit having circuitry and logic to execute store and load instructions, the load store unit having a prefetcher, wherein the processor is configured to:

detect a store instruction for data where the store instruction has been preset as an indicator of a future load for the data;

in response to detecting the store instruction, send a prefetch request to the memory subsystem for an entire cache line containing the data referenced in the store instruction; and receive in the one or more data caches, in response to the prefetch request, the entire cache line containing the data referenced in the store instruction.

12. The system according to claim 11, wherein the prefetcher is configured to send the prefetch request to the memory subsystem for only a single, entire cache line.

13. The system according to claim 11, wherein the data referenced by the store instruction is not for an entire cache line.

14. The system according to claim 1, wherein the processor is further configured to:

perform a store read operation for the entire cache line containing the data referenced in the store instruction;

use only a portion of the entire cache line retrieved from memory.

15. The system according to claim 14, wherein the processor is further configured to:

receive the entire cache line from the memory subsystem;

overwrite a first portion of the entire cache line received from the memory subsystem that contains the data referenced in the store instruction; and keep a second portion of the entire cache line containing the data not referenced in the store instruction.

16. The system according to claim 11, wherein the processor is further configured to:

process a subsequent load instruction after the store instruction, where the load instruction is for the same data referenced in the store instruction; and use the data referenced in the store instruction for the subsequent load instruction.

17. The system according to claim 11, wherein processor is configured to process the store instruction where the store instruction references a designated stack access register.

18. The system according to claim 11, wherein the processor is further configured to process the prefetch request where the prefetch request contains instructions to transmit the entire cache line to cache.

19. The system according to claim 11, further comprising:

a decode unit that is configured to detect the store instruction, and in response to detecting the store instruction setting a flag; and the prefetcher is configured to send the prefetch request in response to reading the flag.

20. A processor comprising:

an instruction fetch unit having circuitry and logic to fetch instructions for the processor, including store and load instructions;

a load store unit having circuitry and logic to execute store and load instructions, the load store unit having a prefetcher;

a memory controller having circuitry and logic to manage the store and load instructions;

one or more data caches having circuitry and logic to hold data for use by the processor; and a computer readable storage medium having program instructions, the program instructions executable by the processor, wherein the program instructions when executed by the processor cause the processor to:

detect a store instruction for a stack access to a designated stack access register;

in response to detecting the store instruction for a stack access, send a prefetch request to a memory subsystem for an entire cache line containing the data referenced in the store instruction; and receive in the one or more data caches, in response to the prefetch request, the entire cache line containing the data referenced in the store instruction.

* * * * *